(12) United States Patent
Okamoto (10) Patent No.: US 9,335,445 B2
(45) Date of Patent: May 10, 2016

(54) ANTIREFLECTION ARTICLE AND DISPLAY DEVICE

(75) Inventor: Eiko Okamoto, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 946 days.

(21) Appl. No.: 13/379,746

(22) PCT Filed: Jun. 21, 2010

(86) PCT No.: PCT/JP2010/004128
§ 371 (c)(1),
(2), (4) Date: Feb. 7, 2012

(87) PCT Pub. No.: WO2010/150514
PCT Pub. Date: Dec. 29, 2010

(65) Prior Publication Data
US 2012/0127580 A1 May 24, 2012

(30) Foreign Application Priority Data
Jun. 23, 2009 (JP) .................................. 2009-148664

(51) Int. Cl.
*G02B 1/118* (2015.01)
(52) U.S. Cl.
CPC ....................................... *G02B 1/118* (2013.01)
(58) Field of Classification Search
CPC ............ G02B 1/118; G02B 1/10; G02B 1/11;
G02B 5/02; G02B 5/0215–5/0221; G02B 5/0278; G02B 5/0294
USPC ................. 359/599, 601, 613, 614, 580–581;
349/112, 137; 348/834; 362/606–607, 362/617–620
See application file for complete search history.

(56) References Cited

U.S. PATENT DOCUMENTS

| 9,122,002 | B2 * | 9/2015 | Imaoku .................. G02B 1/118 |
| 2007/0216997 | A1 | 9/2007 | Noguchi et al. |
| 2010/0328776 | A1 * | 12/2010 | Sanari et al. .................. 359/601 |

FOREIGN PATENT DOCUMENTS

| CN | 1447134 A | 10/2003 |
| CN | 101090928 A | 12/2007 |

(Continued)

OTHER PUBLICATIONS

Chinese Office Action dated Aug. 2, 2013 for corresponding Chinese Application No. 201080027756.5.

(Continued)

*Primary Examiner* — Stephone B Allen
*Assistant Examiner* — James McGee
(74) *Attorney, Agent, or Firm* — Morgan, Lewis & Bockius LLP (57) ABSTRACT

The present invention relates to an antireflection article of which the first surface has sufficient abrasion resistance and can suppress reflectance to a low level throughout the visible light region, and a display device. The present invention relates to an antireflection article that has light transmittance, in which a plurality of convex portions are disposed on a first surface positioned at a visible side and a second surface opposite to the first surface, the average gap of the convex portions is 400 nm or less, the ratio (H1/W1) of the height H1 of the convex portions and the width W1 of the bottoms of the convex portions is 1.3 or more, in the first surface, and the ratio (H2/W2) of the height H2 of the convex portions and the width W2 of the bottoms of the convex portions is larger than the ratio (H1/W1), in the second surface.

7 Claims, 3 Drawing Sheets

(56) References Cited

FOREIGN PATENT DOCUMENTS

| JP | 2000-308860 A | 11/2000 |
|---|---|---|
| JP | 2002-267815 | 9/2002 |
| JP | 2003-215314 | 7/2003 |
| JP | 2004-347778 A | 12/2004 |
| JP | 2005-181361 | 7/2005 |
| JP | 2007-240954 | 9/2007 |
| JP | 2007-256340 | 10/2007 |
| JP | 2009-031764 | 2/2009 |
| JP | 2009-104103 | 5/2009 |
| WO | WO 2009044578 A1 * | 4/2009 |

OTHER PUBLICATIONS

International Search Report from application No. PCT/JP2010/004128 dated Aug. 3, 2010.
Office Action issued in corresponding Korean Patent Application No. 10-2014-7004562 dated Sep. 4, 2015.

* cited by examiner

ANTIREFLECTION ARTICLE AND DISPLAY DEVICE

TECHNICAL FIELD

The present invention relates to an antireflection article and a display device. The present application is a national stage of PCT International Application No. PCT/JP2010/004128, filed on Jun. 21, 2010. Priority is claimed to Japanese Patent Application No. 2009-148664, filed Jun. 23, 2009, the contents of which is incorporated herein by reference.

BACKGROUND ART

Articles having a fine concave-convex structure with a cycle which is equal to or less than the wavelength of visible light on the surface thereof have been known to show an antireflective effect, a lotus effect, and the like. In particular, a fine concave-convex structure called a moth-eye structure has been known as effective antireflection means because a refractive index continuously increases from the refractive index of air to the refractive index of the material of the article.

An article having a fine concave-convex structure on one surface or both surfaces has been proposed as an antireflection article (Patent Documents 1 and 2).

However, since the convex portions of the fine concave-convex structure are very small, the mechanical strength is low and the fine concave-convex structure on the surfaces of the antireflection article has insufficient abrasion resistance. Therefore, when the antireflection article is used for a protective filter with an antireflective function in a display device, and when a person or an object touches the surface thereof, the fine concave-convex structure is easily damaged and the antireflective function deteriorates.

It is preferable to reduce the aspect ratio of the convex portion (the ratio of the height of the convex portion and the width of the bottom of the convex portion) in order to increase the mechanical strength of the convex portion, which forms the fine concave-convex structure.

However, when the aspect ratio of the convex portion is low, the difference between the maximum reflectance and the minimum reflectance in the visible light range increases, that is, the reflectance has wavelength dependency, such that it is difficult to sufficiently suppress reflection of light with some wavelengths.

CITATION LIST

Patent Documents

[Patent Document 1] JP-A-2002-267815
[Patent Document 2] JP-A-2007-240954

SUMMARY OF THE INVENTION

Problem to be Solved by the Invention

The present invention relates to an antireflection article of which the surface that a person or an object is likely to touch has sufficient abrasion resistance and can suppress reflectance to be low throughout the visible light range, and a display device.

Means for Solving the Problem

An antireflection article of the present invention is an antireflection article that has light transmittance having a plurality of convex portions disposed on a first surface positioned at a visible side and a second surface opposite to the first surface, wherein the average gap of the convex portions is 400 nm or less, the ratio (H1/W1) of the height H1 of the convex portions and the width W1 of the bottoms of the convex portions is 1.3 or more, in the first surface, and the ratio (H2/W2) of the height H2 of the convex portions and the width W2 of the bottoms of the convex portions is larger than the ratio (H1/W1), in the second surface.

In the antireflection article of the present invention, the ratio (H1/W1) of the height H1 of the convex portions and the width W1 of the bottoms of the convex portions is preferably 2.1 or less, in the first surface.

In the antireflection article of the present invention, $H1/W1+H2/W2 \geq 3.1$ are preferable.

In the antireflection article of the present invention, luminous reflectance of the antireflection article is preferably 0.4% or less.

In the antireflection article of the present invention, the difference ($\Delta R$) between the maximum reflectance and the minimum reflectance in the range of wavelength of 380 to 780 nm is preferably 1.0% or less.

In the antireflection article of the present invention, the difference ($\Delta R$) between the maximum reflectance and the minimum reflectance in the range of wavelength of 380 to 780 nm is preferably 0.6% or less.

A display device of the present invention includes: a display main body; and the antireflection article of the present invention which is disposed ahead of a screen of the display main body, with the first surface at a visible side and the second surface at the display main body side.

Effects of the Invention

An antireflection article of the present invention of which the surface where a person or an object is likely to come in contact has sufficient abrasion resistance and can suppress reflectance at a low level throughout the visible light region.

A display device of the present invention has the outermost surface of the screen side, which has sufficient abrasion resistance, and reflectance at the outermost surface of the screen side is sufficiently low throughout the visible light region.

EMBODIMENTS OF THE INVENTION (Meth) acrylate implies acrylate or methacrylate herein. Further, an active energy beam implies visible light, ultraviolet light, an electron beam, plasma, a heat ray (infrared light), or the like.

<Antireflection Article>

Figure 1:
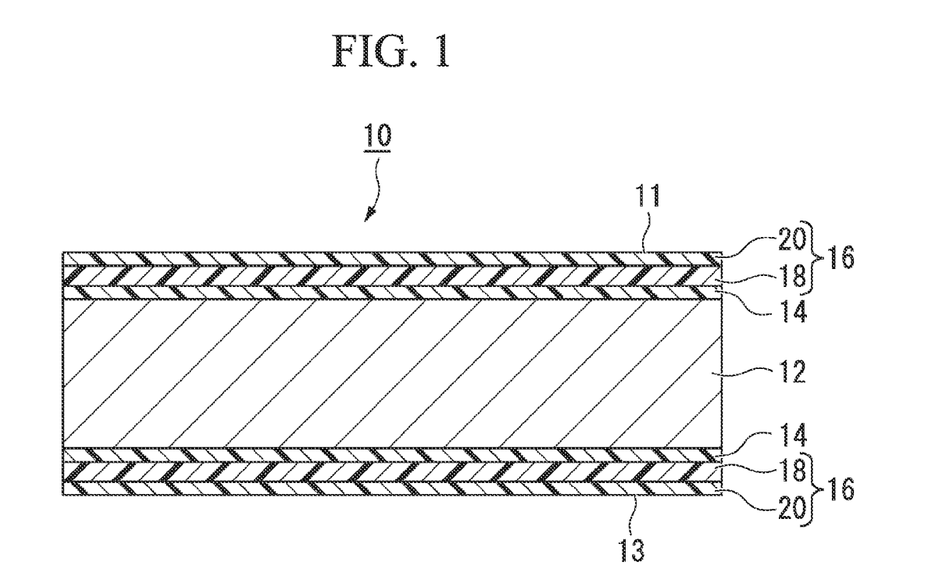
FIG. 1 is a cross-sectional view showing an example of an antireflection article of the present invention.

FIG. 1 is a cross-sectional view showing an example of an antireflection article of the present invention. An antireflection article 10 includes a base main body 12 and an antireflection film 16 having a plurality of convex portions (not shown) on a surface and bonded to the front surface (first surface 11 side) and the rear surface (second surface 13 side) of the base main body 12 through an adhesive layer 14.

Further, the antireflection article including the base main body 12 and the antireflection film 16 of the present invention may be achieved by insert forming, without using the adhesive layer 14.

(Base Main Body)

The base main body 12 is a base material having light transmittance. The material of the base main body 12 may be glass, acrylic resin, polycarbonate, styrene-based resin, polyester, cellulosic resin (triacetylcellulose or the like), polyolefin, alicyclic polyolefin, or the like.

(Adhesive Layer)

The adhesive of the adhesive layer 14 may be a well-known transparent adhesive, a double-sided adhesive tape, or the like.

(Antireflection Film)

Figure 2:
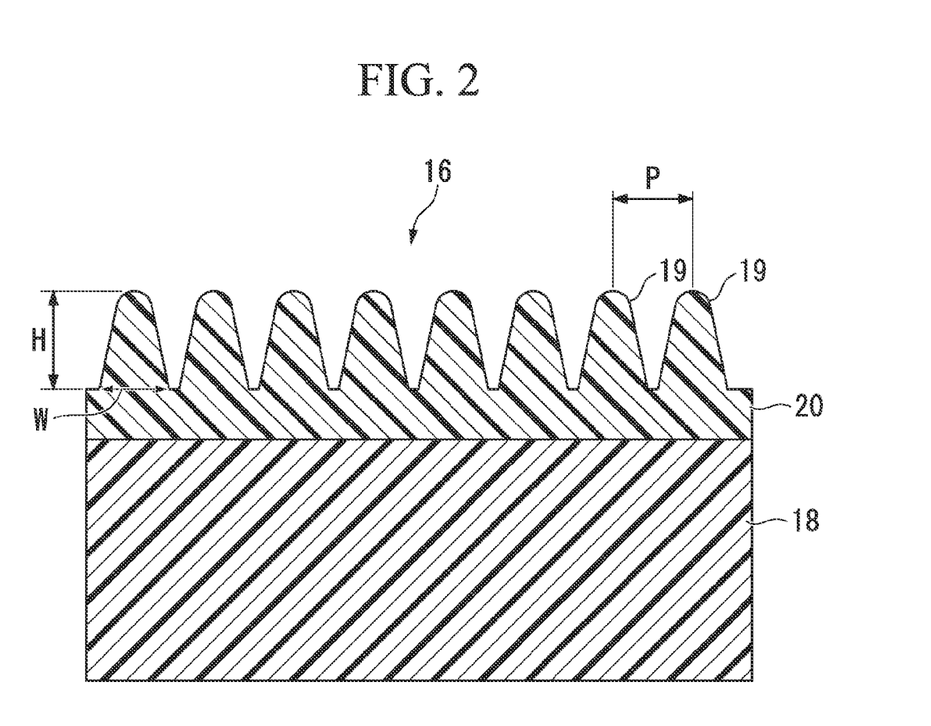
FIG. 2 is a cross-sectional view showing an example of an antireflection film used in an antireflection article of the present invention.

The antireflection film 16, as shown in FIG. 2, includes a film main body 18 and a cured resin film 20 having a plurality of convex portions 19 and formed on the front surface of the film main body 18.

The film main body 18 is a film having light transmittance. The material of the film main body 18 may be acrylic resin, polycarbonate, styrene-based resin, polyester, cellulosic resin (triacetylcellulose or the like), polyolefin, alicyclic polyolefin, or the like.

The cured resin film 20 is a light-transmissive film made of a hardened material of an active energy beam-curable resin composition described later and has the convex portions 19 on the front surface.

It is preferable to form the convex portions 19 by transcribing a plurality of fine pores (concave portions) on the front surface of anodized alumina.

It is preferable that the convex portions 19 have a so-called moth-eye structure in which a plurality of protrusions (convex portions), which has a substantially conical shape, a pyramid shape, a conical frustum shape, a bell shape or the like, is aligned. The moth-eye structure having the gap between protrusions equal to or less than the wavelength of the visible light, that is, equal to or less than 400 nm has been known to be effective antireflective means because the refractive index continuously increases from the refractive index of air to the refractive index of the material.

The average gap between the convex portions of 200 nm or less is preferable and 150 nm or less is particularly preferable to remove unnecessary diffracted light.

The average gap between the convex portions 19 is achieved by observing a cross-section of the cured resin film 20 with an electron microscope, measuring the gap P of adjacent convex portions 19 (the distance from the center of a convex portion 19 to the center of an adjacent convex portion 19) at five points, and then averaging the values.

The height H1 of the convex portions 19 from the front surface is preferably 130 to 210 nm, more preferably 140 to 200 nm, and most preferably 140 to 170 nm. When the height H1 of the convex portions 19 is equal to or more than 130 nm, the reflection ratio is sufficiently low. When the height H1 of the convex portions 19 from the front surface is equal to or less than 210 nm, the mechanical strength of the convex portion 19 is favorable.

The height H2 of the convex portions 19 from the rear surface is preferably 150 to 500 nm, more preferably 150 to 400 nm, and most preferably 150 to 300 nm. When the height H2 of the convex portions 19 is equal to or more than 150 nm, the reflectance is sufficiently low and wavelength dependency is reduced. Further, the larger the height H2 of the convex portions 19 from the rear surface, the more the wavelength dependency of the reflectance becomes favorable, such that the height is not specifically limited, but 500 nm or less is suitable for easy manufacturing.

It is possible to measure the heights H1 and H2 by observing a cross-section of the cured resin film 20 with an electron microscope.

The H1 and H2 are the heights from the same plane as the lowermost portion of the concave portions formed around the convex portions 19 (hereafter, referred to as a reference surface) to the uppermost portion of the convex portions 19.

According to an aspect of the present invention, the ratio (H/W) of the height H of the convex portions 19 and the width W of the bottoms of the convex portions 19 is different at the front surface of the antireflection article 10 (first surface 11) and the rear surface (second surface 13).

Since the first surface 11 is the front surface that a person or an object may touch, it is necessary to decrease the ratio (H1/W1) of the height H1 of the convex portions 19 and the width W1 of the bottoms of the convex portions 19 as small as possible in order to increase the mechanical strength in the first surface 11. In detail, the ratio H1/W1 is 2.1 or less, preferably 2.0 or less, and more preferably 1.7 or less. Further, the ratio H1/W1 is preferably 1.3 or more, and more preferably 1.4 or more, in order to improve the reflectance and the wavelength dependency of the antireflection article 10.

On the other hand, the second surface 13 is the rear surface that a person or an object is not likely to contact, such that the ratio (H2/W2) of the height H2 of the convex portions 19 and the width W2 of the bottoms of the convex portions 19 can be set to be relatively large, in the second surface 13. Although it is preferable that the ratio H2/W2 be larger than the ratio H1/W1, the ratio H2/W2 is preferably larger by 0.3 or more and more preferably by 0.6 or more than the ratio H1/H2 for 1.3 H1/W1 1.5, in order to improve the reflectance and the wavelength dependency of the antireflection article 10. Further, the ratio H2/W2 is preferably larger by 0.3 or more than the ratio H1/W1 for 1.5<H1/W1 1.9. Further, the ratio H2/W2 is preferably larger by 0.1 or more than the ratio H1/W1 for 1.9<H1/W1. Further, although the ratio H2/W2 is not specifically limited because the larger the ratio, the more favorable the wavelength dependency of the reflectance becomes, the ratio is preferably 4.0 or less and more preferably 2.3 or less for easy manufacturing.

The sum of the ratios H1/W1 and H2/W2 (H1/W1+H2/W2) is preferably 3.1 or more and more preferably 3.5 or more, from a viewpoint that the reflectance of the antireflection article 10 and the wavelength dependency thereof are improved.

It is possible to measure the widths W1 and W2 by observing a cross-section of the cured resin film 20 with an electron microscope.

The widths W1 and W2 are the widths of the reference surface.

The difference between the refractive index of the cured resin film 20 and the refractive index of the film main body 18 is preferably 0.2 or less, more preferably 0.1 or less, and particularly preferably 0.05 or less. When the refractive index difference is 0.2 or less, reflection at the interface of the cured resin film 20 and the film main body 18 is suppressed.

When a surface has a moth-eye structure, it has been known that when the surface is made of a hydrophobic material, super hydrophobicity is acquired by a lotus effect, or when the surface is made of a hydrophilic material, super hydrophilicity is acquired.

The water contact angle of the surface of a moth-eye structure when the cured resin film 20 is made of a hydrophobic material is preferably 90° or more, more preferably 100° or more, and particularly preferably 110° or more. When the water contact angle is 90° or more, sludge does not easily adhere, such that a sufficient antifouling property is achieved. Further, since water does not easily adhere, it is possible to expect ice suppression.

The water contact angle of the surface of a moth-eye structure when the cured resin film 20 is made of a hydrophilic material is preferably 25° or less, more preferably 23° or less, and particularly preferably 21° or less. When the water contact angle is 25° or less, the sludge adhering to the surface is removed by water and oil does not easily adhere, such that a sufficient antifouling property is achieved. It is preferable that the water contact angle be 3° or more to suppress deformation of the moth-eye structure due to absorption of the cured resin film 20 and an increase in reflectance due to the deformation.

The luminous reflectance of the antireflection article 10 is preferably 0.4% or less, more preferably 0.35% or less, and most preferably 0.30% or less.

The difference (ΔR) between the maximum reflectance and the minimum reflectance in the wavelength range of 380 to 780 nm of the antireflection article 10 is preferably 1.0% or less and more preferably 0.6% or less.

<Manufacturing Method of Antireflection Article>

The antireflection article 10 is manufactured by bonding two kinds antireflection films 16 with different ratios H/W of the convex portions 19 to both surfaces of the base main body 12 through the adhesive layer 14.

Figure 3:
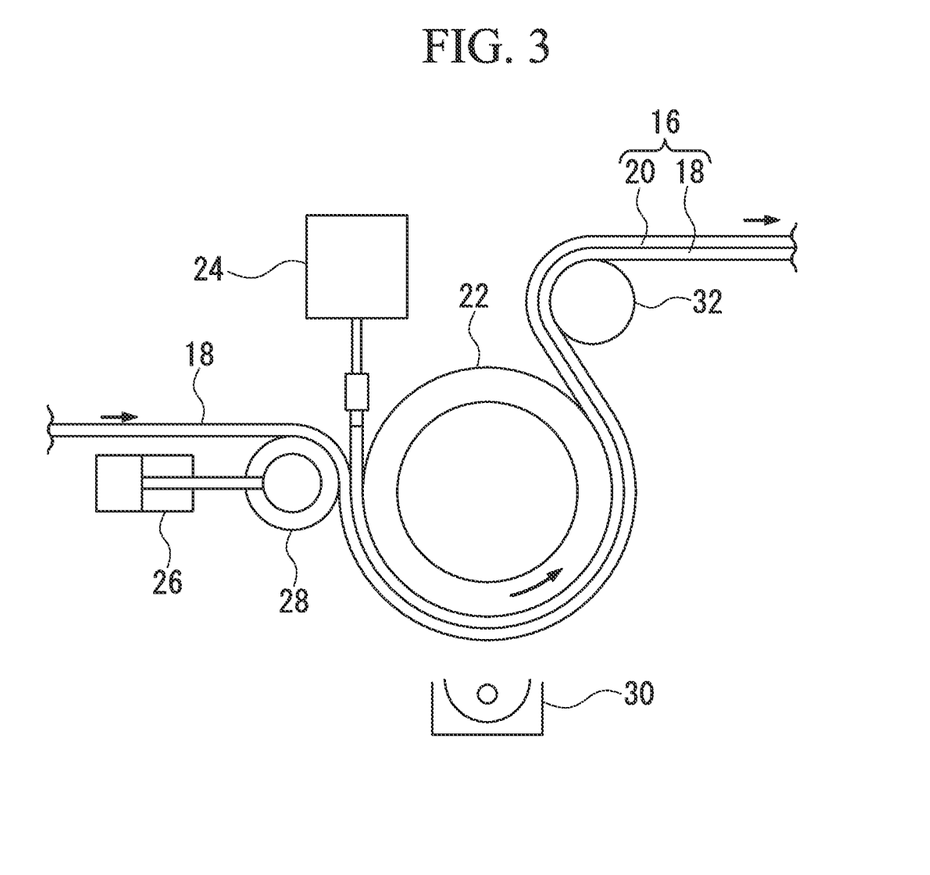
FIG. 3 is a configuration diagram showing an example of an apparatus for manufacturing an antireflection film used in an antireflection article of the present invention.

The antireflection films 16 may be manufactured, for example, by using the manufacturing apparatus shown in FIG. 3, as follows.

An active energy beam-curable resin composition is supplied between a roll-shaped mold 22 having a plurality of concave portions (not shown) corresponding to the convex portions 19 on the front surface and a band-shaped film main body 18 moving along the front surface of the roll-shaped mold 22, from a tank 24.

The film main body 18 and the active energy beam-curable resin composition are nipped between the roll-shaped mold 22 and a nip roll 28 with nip pressure adjusted by a pneumatic cylinder 26 and the active energy beam-curable resin composition is filled into concave portions of the roll-shaped mold 22 while being uniformly diffused between the film main body 18 and the roll-shaped mold 22.

The cured resin film 20 with a plurality of concave portions transcribed on the surface of the rolled mold 22 is formed by radiating an active energy beam to an active energy beam-curable resin composition through the film main body 18 from an active energy beam-radiating device 30 disposed under the roll-shaped mold 22.

The antireflection film 16 is achieved by separating the film main body 18 with the cured resin film 20 on the surface by a separating roll 32.

A high-pressure mercury lamp and a metal halide lamp are preferable as the active energy beam-radiating device 30, in which the light radiation energy amount is preferably 100 to 10000 mJ/cm².

(Roll-shaped Mold)

The roll-shaped mold 22 is a mold having anodized alumina on the surface. The mold having an anodized alumina on the surface can be increased in area without a joint and simply manufactured.

The anodized alumina is a porous oxide film (alumite) made of aluminum and has a plurality of fine pores (concave portions) on the surface.

The mold having anodized alumina on the surface may be manufactured through the following processes (a) to (e), for example.

(a) Process of forming an oxide film by anodizing roll-shaped aluminum under a constant voltage in an electrolyte.

(b) Process of forming fine pore generation points of anodizing by removing an oxide film.

(c) Process of forming an oxide film having fine pores at the fine pore generation points by anodizing again the roll-shaped aluminum in an electrolyte.

(d) Process of increasing the diameter of the fine pores.

(e) Process of repeating processes (c) and (d).

Figure 4:
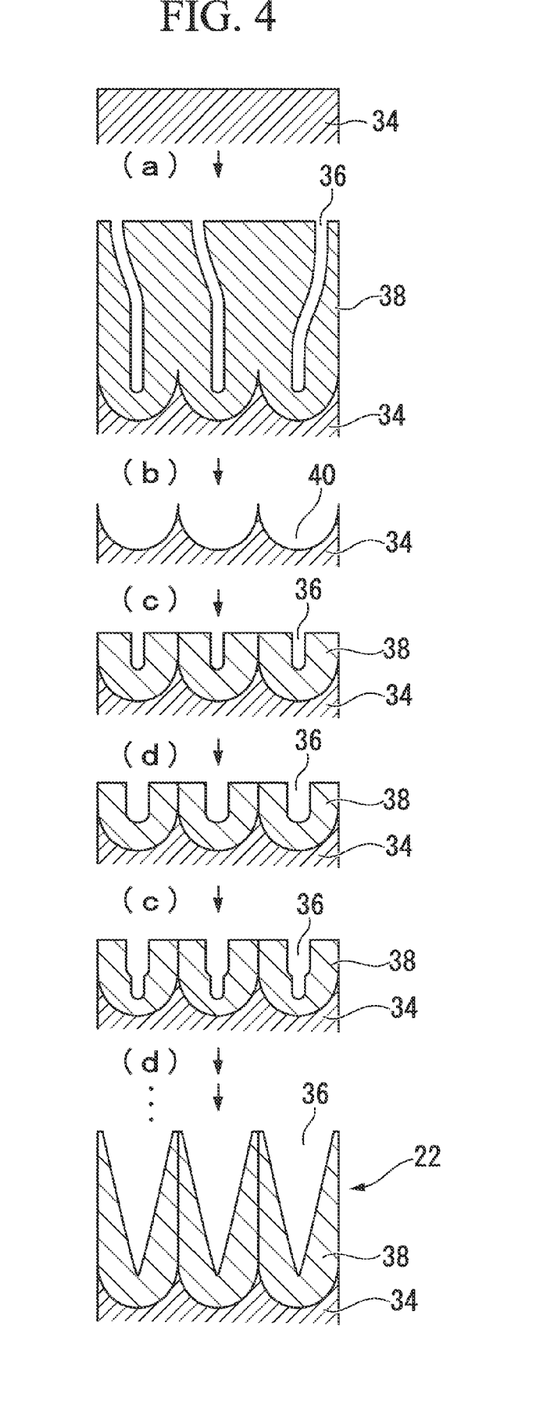
FIG. 4 is a cross-sectional view showing a process of manufacturing a mold having anodized alumina on the surface.

Process (a):

As shown in FIG. 4, an oxide film 38 having fine pores 36 is formed, when aluminum 34 is anodized.

Purity of the aluminum is preferably 99% or more, more preferably 99.5% or more, and particularly preferably 99.8%. When the purity of the aluminum is low, a concave-convex structure that is sized such that the visible light is dispersed by segregation of impurities may be formed or regularity of fine pores acquired by anodizing may be reduced, when aluminum is anodized.

The electrolyte may be sulfuric acid or oxalic acid.

When oxalic acid is used as an electrolyte:

The concentration of oxalic acid is preferably 0.7M or less. When the concentration of oxalic acid is above 0.7M, a current value is so high that the surface of an oxide film may be roughened.

Anodized alumina having fine pores with high regularity of a cycle of 100 nm can be achieved when a formation voltage is 30 to 60V. The regularity has a tendency to decrease, when the formation voltage is either higher or lower than the range.

The temperature of the electrolyte is preferably 60° C. or less and more preferably 45° C. or less. When the temperature of the electrolyte is above 60° C., a phenomenon, so-called "burning", occurs, such that the fine pores are damaged or the regularity of the fine pores is broken due to melting of the surface.

When sulfuric acid is used as an electrolyte:

The concentration of sulfuric acid is preferably 0.7M or less. When the concentration of sulfuric acid is above 0.7M, a current value is so high that it may be difficult to maintain a constant voltage.

Anodized alumina having fine pores with high regularity of a cycle of 63 nm can be achieved when a formation voltage is 25 to 30V. The regularity has a tendency to decrease, when the formation voltage is either higher or lower than the range.

The temperature of the electrolyte is preferably 30° C. or less and more preferably 20° C. or less. When the temperature of the electrolyte is above 30° C., a phenomenon, so-called "burning", occurs, such that the fine pores are damaged or the regularity of the fine pores is broken due to melting of the surface.

Process (b):

As shown in FIG. 4, it is possible to improve the regularity of the fine pores by once removing the oxide film 38 to form anodized fine pore generation points 40.

A method of removing an oxide film by dissolving with a solution that selectively dissolves an oxide film, without dissolving aluminum, may be exemplified as a method of removing the oxide film. For example, the solution may be a chromic acid/phosphoric mixture.

Process (c):

As shown in FIG. 4, the oxide film 38 having cylindrical fine pores 36 is formed, when the aluminum 34 with the oxide film removed is anodized again.

It is preferable to perform the anodizing under the same conditions as the process (a). The longer the time of anodizing, the deeper the fine pores can be acquired.

Process (d):

As shown in FIG. 4, a process of increasing the diameter of the fine pores 36 (hereafter, referred to as a fine pore diameter increasing process) is performed. The fine pore diameter increasing process is a process of increasing the diameter of the fine pores by immersion in a solution that dissolves an oxide film for anodizing. For example, the solution may be a phosphoric acid aqueous solution of about 5% by mass.

The longer the time of the fine pore diameter increasing process, the larger the fine pores are.

Process (e):

As shown in FIG. 4, anodized alumina having the fine pores 36 continuously decreasing in diameter from the opening in the depth direction when anodizing of the process (c) and the fine pore diameter increasing process (d) are repeated, such that a mold (the roll-shaped mold 22) having anodized alumina on the surface is achieved. The number of times of repeating is preferably three or more in total and more preferably 5 or more. For two or less number of times of repeating, the diameter of the fine pore discontinuously decreases, such that effect of reducing the reflectance of the cured resin film 20 manufactured by using anodized alumina having the fine pores is not sufficient.

The surface of the anodized alumina may be treated with a mold lubricant such that the cured resin film 20 is easily separated. The treatment method may be, for example, a method of coating silicone resin or fluorine-containing polymer, a method of depositing fluorine-containing compound, and a method of coating a fluorine-containing silane-coupling agent or fluorine-containing silicone-based silane-coupling agent.

The shape of the fine pores 36 may be a substantially conical shape, a frustum shape, a conical frustum shape, and an inverse bell shape.

The average gap between the fine pores 36 is equal to or less than the wavelength of visible light, that is, 400 nm or less. The average gap of the fine pores 36 is preferably 25 nm or more.

The depth of the fine pores 36 is preferably 100 to 530 nm, and more preferably 150 to 300 nm.

The surface of the cured resin film 20 formed by transcribing the fine pores 36 shown in FIG. 4 has a so-called moth-eye structure.

Further, it is preferable to provide two types of roll-shape molds 22 with different aspect ratios of fine pores (concave portions) on the surface (depth of fine pores/width of the openings of the fine pores) in order to manufacture two types of antireflection films 16 with different ratios of H/W of the convex portions 19.

Further, it may be possible to change the filling rate of the fine pores by changing the viscosity of the active energy beam-curable resin composition, by using the roll-shaped mold with the same aspect ratio.

Further, the roll-shaped mold 22 may be replaced by a flat plate-shaped mold.

(Active Energy Beam-curable Resin Composition)

The active energy beam-curable resin composition includes a polymerizable compound and polymeric initiator.

The polymerizable compound may be a monomer, an oligomer, or a reactive polymer, which has radical polymerizable bonding and/or cation-polymerizable bonding in particles.

The active energy beam-curable resin composition may contain a non-reactive polymer and an active energy beam sol-gel reactive composite.

The monomer having radical polymerizable bonding may be a monofunctional monomer and a multifunctional monomer.

The monofunctional monomer may be an acrylate derivative, such as methyl(meth)acrylate, ethyl(meth)acrylate, propyl(meth)acrylate, n-butyl(meth)acrylate, i-butyl(meth)acrylate, s-butyl(meth)acrylate, t-butyl(meth)acrylate, 2-ethylhexyl(meth)acrylate, lauryl(meth)acrylate, alkyl(meth)acrylate, tridecyl(meth)acrylate, stearyl(meth)acrylate, cyclohexyl(meth)acrylate, benzyl(meth)acrylate, phenoxyethyl(meth)acrylate, isobornyl(meth)acrylate, glycidyl (meth)acrylate, tetrahydrofurfuryl(meth) acrylate, allyl (meth)acrylate, 2-hydroxyethyl(meth)acrylate, hydroxypropyl(meth) acrylate, 2-methoxyethyl(meth)acrylate, 2-ethoxyethyl(meth)acrylate; (meth)acrylic acid and (meth)acrylonitrile; a styrene derivative, such as styrene and α-methyl styrene; and (meth)acrylamide derivative, such as, (meth)acrylamide, N-dimethyl(meth) acrylamide, N-diethyl (meth)acrylamide, and dimethylaminopropyl(meth)acrylamide. These substances may be independently used or two or more substances may be used together.

The multifunctional monomer may be a bifunctional monomer, such as ethylene glycol di(meth)acrylate, tripropylene glycol di(meth)acrylate, isocyanuric acid ethylene oxide denatured di(meth)acrylate, triethylene glycol di(meth) acrylate, diethylene glycol di(meth)acrylate, neopentylglycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth) acryloxypolytoxyphenyl) propane, 2,2-bis(4-(meth) acryloxypolyethoxyphenyl)propane, 2,2-bis(4-(3-(meth) acryloxy-2-hydroxy propoxy)phenyl) propane, 1,2-bis(3-(meth)acryloxy-2-hydroxy propoxy)ethane, 1,4-bis(3-(meth)acryloxy-2-hydroxy propoxy) butane, dimethylol tricyclo decane di(meth)acrylate, ethylene oxide addition di(meth)acrylate of the bispenol A, propylene oxide addition di(meth)acrylate of the bispenol A, hydroxypivalic acid neopentylglycol di(meth)acrylate, divinylbenzene, and methylenebisacrylamide; trifunctional monomer such as pentaerythritole tri(meth)acrylate, trimethylol propane tri(meth) acrylate, trimethylol propane ethylene oxide denatured tri (meth)acrylate, trimethylol propane propylene oxide denatured triacrylate, trimethylol propane ethylene oxide denatured triacrylate, isocyanuric acid ethylene oxide denatured tri(meth)acrylate; tetrafunctional or higher monomer, such as condensation reaction mixture of succinic acid/trimethylolethane/acrylic acid, di-pentaerythritol hexa(meth) acrylate, di-pentaerythritol penta(meth)acrylate, di-trimethylol propane tetra acrylate, and tetramethylol methane tetra (meth)acrylate; and bifunctional or higher urethane acrylate and bifunctional polyester acrylate. These substances may be independently used or two or more substances may be used together.

The monomer having cation-polymerizable bonding may be a monomer having an epoxy group, an oxetanyl group, an oxazolyl group, and a vinyloxy group, and particularly preferably a monomer having an epoxy group.

The oligomer or reactive polymer may be unsaturated polyesters, such as a condensate of unsaturated dicarboxylic acid and polyalcohol; and polyester(meth)acrylate, polyether (meth)acrylate, polyol(meth)acrylate, epoxy(meth)acrylate, urethane(meth)acrylate, a cationic polymerization type epoxy compound, and a monomer or a copolymerization polymer of the monomers, which has radical polymerizable bonding in the side chain.

The non-reactive polymer may be acrylic resin, styrenic resin, polyurethane, cellulose resin, polyvinyl butyral, polyester, and a thermoplastic elastomer.

The active energy beam sol-gel reactive composite may be an alkoxy silane compound and an alkyl silicate compound.

The alkoxysilane compound may be a compound derivative from the following chemical formula (1).

$R^{11}$ and $R^{12}$ represent alkyl groups having a carbon number of 1 to 10, respectively, and x and y are integers satisfying the relationship of x+y=4.

The alkoxysilane compound may be tetramethoxysilane, tetra-1-propoxysilane, tetra-n-propoxysilane, tetra-n-butoxysilane, tetra-sec-butoxysilane, tetra-t-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, and trimethylbutoxy silane.

The alkylsilicate compound may be a compound derivative from the following chemical formula (2).

$R^{21}$ and $R^{24}$ represent alkyl groups having a carbon number of 1 to 5, respectively, and z is an integer from 3 to 20.

The alkylsilicate compound may be methylsilicate, ethylsilicate, isopropylsilicate, n-propylsilicate, n-butylsilicate, n-pentylsilicate, and acetylsilicate.

When a light curing reaction is used, the photopolymerization initiator may be, for example, a carbonyl compound, such as benzoin, benzoinmethylether, benzomethylether, benzoinisopropylether, benzoinisobutylether, benzyl, benzophenone, p-methoxybenzophenone, 2,2-diethoxyacetophenone, α,α-dimethoxy-α-phenylacetophenone, methylphenylglyoxylate, ethylpenylglyoxylate, 4,4'-bis(dimethylamino)benzophenone, 2-hydroxy-2-methyl-1-phenylpropan-1-on; Sulfur compounds, such as tetramethylthiurammonosulfide, tetramethylthiuramdisulfide; 2,4,6-trimethylbenzoyldiphenylphosphineoxide, and benzoyldiethoxyphosphineoxide. These compounds may be independently used or two or more compounds may be used together.

When an electron radiation curing reaction is used, the polymerization initiator may be thioxanthone such as, benzophenone, 4,4-bis(diethylamino)benzophenone, 2,4,6-trimethylbenzophenone, methylorthobenzoylbenzoate, 4-phenylbenzophenone, t-butylanthraquinone, 2-ethyl anthraquinone, 2,4-diethyl thioxanthone, isopropylthioxanthone, and 2,4-dichlorothioxanthone; acetopheon, such as diethoxyacetophenone, 2-hydroxy-2-methyl-1-phenylpropan-1-on, benzyldimethylketal, 1-hydroxycyclohexyl-phenyl ketone, 2-methyl-2-morpholino (4-thio methylphenyl) propan-1-one, and 2-benzyl-2-dimethylamino-1-(4-morpholinophenyl)-butanone; benzoin ether, such as benzoinmethylether, benzomethylether, benzoinisopropylether, and benzoinisobutylether; acyl phosphine oxides, such as 2,4,6-trimethylbenzoyldiphenylphosphineoxide, bis(2,6-dimethoxybenzoyl)-2,4,4-trimethylpentylphosphineoxide, and bis(2,4,6-trimethylbenzoyl)-phenyl phosphine oxide; methylbensoylformate, 1,7-bisacridinylheptan, and 9-phenyl acridine. These substances may be independently used or two or more substances may be used together.

When a thermosetting reaction is used, the heat polymerization initiator may be, for example, organic peroxides, such as methylethylketoneperoxide, benzoylperoxide, dicumyl peroxide, t-butylhydroperoxide, cumenehydroperoxide, t-butylperoxyloctoate, t-butyl peroxylbenzoate, lauroylperoxide; and azo compounds, such as azobisisobutyronitrile; and redox polymerization initiators in which an amine, such as N,N-dimethylaniline and N,N-dimethyl-p-toluidine, is mixed with the organic peroxide.

The amount of the polymerization initiator is preferably 0.1 to 10 parts by mass of a polymerizable compound of 100 parts by mass. When the amount of the polymerization initiator is under 0.1 parts by mass, polymerization does not easily progress. When the amount of the polymerization initiator is above 10 parts by mass, a cured film may be dyed or mechanical strength may be reduced.

The active energy beam-curable resin composition may include an additive, such as an antistat, a parting agent, and a fluorine compound for improving antifouling property; fine particles, and a small amount of solvent, if necessary.

(Hydrophobic Material)

In order to make the water contact angle of the surface of the moth-eye structure of the cured resin film 20, 90° or more, it is preferable to use a composite including a fluorine-containing compound or a silicone-based compound as the active energy beam-curable resin composition forming a hydrophobic material.

Fluorine-containing Compound:

A compound having a fluorine alkyl group expressed by the following chemical formula (3) is preferable as the fluorine-containing compound.

X is a fluorine atom or hydrogen atom and n is an integer of 1 or more, which is preferably 1 to 20, more preferably 3 to 10, and particularly preferably 4 to 8.

The fluorine-containing compound may be a fluorine-containing monomer, a fluorine-containing silane-coupling agent, a fluorine-containing surfactant, or a fluorine-containing polymer.

The fluorine-containing monomer may be fluoroalkyl group-substituted vinyl monomer, fluoroalkyl group-substituted ring-opening polymerizable monomer, or the like.

The fluoroalkyl group-substituted vinyl monomer may be a fluoroalkyl group-substituted(meth)acrylate, fluoroalkyl group-substituted(meth)acrylicamide, fluoroalkyl group-substituted vinyl ether, fluoroalkyl group-substituted styrene, or the like.

The fluoroalkyl group-substituted ring-opening polymerizable monomer may be a fluoroalkyl group-substituted epoxy compound, a fluoroalkyl group-substituted oxetane compound, a fluoroalkyl group-substituted oxazoline compound, or the like.

The fluorine-containing monomer is preferably a fluoroalkyl group-substituted (meth)acrylate and the compound in the following chemical formula (4) is particularly preferable.

$R^{41}$ represents a hydrogen atom or a methyl group, X represents a hydrogen atom or fluorine atom, m is an integer of 1 to 6, preferably 1 to 3, and more preferably 1 or 2, and n is an integer of 1 to 20, preferably 3 to 10, and more preferably 4 to 8.

The fluorine-containing silane-coupling agent is preferably a fluoroalkyl group-substituted silane-coupling agent and the compound in the following chemical formula (5) is particularly preferable.

$R^f$ represents a fluorine substitution alkyl group having a carbon number of 1 to 20, which may contain one or more of an ether bonding or ester bonding. $R^f$ may be a 3,3,3-trifluoropropyl group, a tridecafluoro-1,1,2,2-tetrahydrooctyl group, a 3-trifluoromethoxypropyl group, a 3-trifluoroacetoxypropyl group, or the like.

$R^{51}$ represents an alkyl group having a carbon number of 1 to 10. $R^{51}$ may be a methyl group, an ethyl group, a cyclohexyl group, or the like.

Y represents a hydroxyl group or a hydrolyzable group.

The hydrolysable group may be an alkoxy group, a halogen atom, $R^{52}C(O)O$ ($R^{52}$ represents an alkyl group having a hydrogen atom number or carbon number of 1 to 10).

The alkoxy group may be a methoxy group, an ethoxy group, a propyloxy group, an i-propyloxybasis, a butoxy group, an i-butoxy group, a t-butoxy group, a pentyloxy group, a hexyloxy group, a cyclohexyloxy group, a heptyloxy group, an octyloxy group, a 2-ethyl hexyloxy group, a nonyloxy group, a decyloxy group, a 3,7-dimethyl octyloxy group, a lauryloxy group, or the like.

The halogen atom may be Cl, Br, I, or the like.

$R^{52}C(O)O$ may be $CH_3C(O)O$, $C_2H_5C(O)O$, or the like.

a, b, and c are expressed by a+b+c=4, which are integers satisfying a≥1 and c≥1 and preferably a=1, b=0, and c=3.

The fluorine-containing silane-coupling agent may be 3,3,3-trifluoropropyltrimethoxysilane, 3,3,3-trifluoropropyltriacetoxysilane, dimethyl-3,3,3-trifluoropropylmethoxysilane, tridecafluoro-1,1,2,2-tetrahydrooctyltriethoxy silane, or the like.

The fluorine-containing surfactant may be a fluoroalkyl group-containing anion surfactant, a fluoroalkyl group-containing cation surfactant, or the like.

The fluoroalkyl group-containing anion surfactant may be fluoroalkyl carboxylic acid having a carbon number of 2-10 or metal salt, perfluorooctanesulfonylglutaminic acid disodium, 3-[omega-fluoroalkyl $(C_6-C_{11})$oxy]-1-alkyl $(C_3-C_4)$ sulfonic acid sodium, 3-[omega-fluoroalkanoyl $(C_6-C_8)$]-N-ethyl amino]-1-propanesulfonic acid sodium, fluoroalkyl $(C_{11}-C_{20})$ carboxylic acid or the metal salt, perfluoroalkyl carboxylic acid $(C_7-C_{13})$ or the metal salt, perfluoroalkyl $(C_4-C_{12})$ sulfonic acid or the metal salt, perfluorooctane sulfonic acid diethanolamides, N-propyl-N-(2-hydroxyethyl) perfluorooctane sulfonamide, perfluoroalkyl $(C_6-C_{10})$ sulfonamide propyltrimethylammonium salt, perfluoroalkyl $(C_6-C_{10})$—N-ethylsulfonylglycine salt, monoperfluoroalkyl $(C_6-C_{16})$ ethyl phosphoric acid ester, or the like.

The fluoroalkyl group-containing cation group surfactants may be aliphatic primary, secondary, or tertiary fluoroalkyl group-containing amine acid, quaternary aliphatic ammonium salt, such as perfluoroalkyl $(C_6-C_{10})$ sulfonamide propyltrimethylammonium salt, benzalkonium salt, benzethonium chloride, pyridinium salt, imidazolinium salt, or the like.

The fluorine-containing polymer may be a polymer of a fluoroalkyl group-containing monomer, a copolymer of a fluoroalkyl group-containing monomer and a poly (oxyalkylene) group-containing monomer, a copolymer of a fluoroalkyl group-based monomer and a cross-linking reaction group-containing monomer. The fluorine-containing polymer may be a copolymer with another copolymerizable monomer.

The fluorine-containing polymer is preferably a copolymer of a fluoroalkyl group-containing monomer and a poly (oxyalkylene) group-containing monomer.

The poly (oxyalkylene) group is preferably a group in the following chemical formula (6).

$$—(OR^{61})_p— \qquad (6)$$

where, $R^{61}$ represents an alkylene group having a carbon number of 2 to 4 and p is a natural number of 2 or more. $R^{61}$ may be $—CH_2CH_2—$, $—CH_2CH_2CH_2—$, $—CH(CH_3)CH_2—$, $—CH(CH_3)CH(CH_3)—$, or the like.

The poly(oxylalkylene) group may be the same oxyalkylene unit ($OR^{61}$) or two or more kinds of oxyalkylene units ($OR^{61}$). Two or more kinds of oxyalkylene units ($OR^{61}$) may be arranged in a block or randomly arranged.

Silicone-based Compound:

The silicone-based compound may be (meth)acrylic denatured silicone, silicone resin, silicone-based silane-coupling agent.

The (meth)acrylic denatured silicone may be silicone(di) (meth)acrylate.

(Hydrophilic Material)

In order to make the water contact angle of the surface of the moth-eye structure of the cured resin film 20, 25° or less, it is preferable to use a composite including the following polymerizable compound as the active energy beam-curable resin composition forming a hydrophilic material.

A polymerizable compound of total 100% by mass composed of multifunctional (tetrafunctional or higher) (meth)acrylate of 10 to 50% by mass, bifunctional or higher hydrophilic(meth)acrylate of 30 to 80% by mass, and monofunctional monomer of 0 to 20% by mass.

The multifunctional (tetrafunctional or higher) (meth) acrylate may be ditrimethylolpropanetetra(meth)acrylate, pentaerythritoltetra(meth)acrylate, pentaerythritolethoxytetra(meth)acrylate, dipentaerythritolhydroxypenta(meth) acrylate, dipentaerythritolhexa(meth)acrylate, a condensation reaction mixture with a molar ratio 1:2:4 of succinic acid/trimethylolethane/acrylic acid, urethane acrylate (EBECRYL220, EBECRYL1290, EBECRYL1290K, EBECRYL5129, EBECRYL8210, EBECRYL8301, KRM8200: made by DAICEL-CYTEC Company LTD.), polyether acrylates (EBECRYL81: made by DAICEL-CYTEC Company LTD.), denaturing epoxy acrylates (EBECRYL3416: made by DAICEL-CYTEC Company LTD.), polyester acrylates (EBECRYL450, EBECRYL657, EBECRYL800, EBECRYL810, EBECRYL811, EBECRYL812, EBECRYL1830, EBECRYL845, EBECRYL846, EBECRYL1870: made by DAICEL-CYTEC Company LTD.), or the like. The compound may be independently used or two or more of the compounds may be used together.

The multifunctional (tetrafunctional or higher) (meth) acrylate is preferably multifunctional (fivefunctional or higher) (meth)acrylate.

The ratio of the multifunctional (tetrafunctional or higher) (meth)acrylate is preferably 10 to 50% by mass, more preferably 20 to 50% by mass, and particularly preferably 30 to 50% by mass, in consideration of water resistance and chemical resistance. When the ratio of the multifunctional (tetrafunctional or higher) (meth) acrylate is 10% by mass or more, the degree of elasticity is high and the abrasion resistance is improved. When the ratio of the multifunctional (tetrafunctional or higher) (meth)acrylate is 50% by mass or less, small cracks are not easily generated on the surface, such that defects are not easily generated.

The bifunctional or higher hydrophilic(meth)acrylate may be multifunctional acrylate having long-chain polyethylene glycol, such as ARONIX M-240, ARONIX M260 (TOAGOSEI Co., Ltd.), NK ester AT-20E, NK ester ATM-35E (SHIN-NAKAMURA CHEMICAL CO., LTD), polyethylene glycol dimethacrylate, or the like. They may be independently used or two or more of them may be used together.

In polyethylene glycol dimethacrylate, the sum of the average repeat unit of polyethylene glycol chains in one molecule is preferably 6 to 40, more preferably 9 to 30, and particularly preferably 12 to 20. When the average repeat unit of polyethylene glycol chains is 6 or more, hydrophilicity is sufficient and the antifouling property is improved. When the average repeat unit of polyethylene glycol chains is 40 or less, compatibility with multifunctional (tetrafunctional or higher) (meth)acrylate is increased, such that an active energy beam-curable resin composition is not easily separated.

The ratio of bifunctional or higher hydrophilic(meth)acrylate is preferably 30 to 80% by mass and more preferably 40 to 70% by mass. When the ratio of bifunctional or higher hydrophilic(meth)acrylate is 30% by mass or more, hydrophilicity is sufficient and the antifouling property is improved. When the ratio of bifunctional or higher hydrophilic(meth)acrylate is 80% by mass or less, the degree of elasticity is increased, such that abrasion resistance is improved.

The multifunctional monomer is preferably a hydrophilic monofunctional monomer.

The hydrophilic monofunctional monomer may be monofunctional (meth) acrylate having a polyethylene glycol chain in an ester group, such as M-20G, M-90G, and M-230G (SHIN-NAKAMURA CHEMICAL CO., LTD), monofunctional (meth) acrylate having a hydroxyl group in ester group, such as hydroxyalkyl(meth)acrylate, cationic monomers, such as monofunctional acrylamides methacrylamide propyl trimethyl ammonium methyl sulfate and methacryloyloxyethyl trimethyl ammonium methyl sulfate.

Further, a viscosity modifier, such as acryloylmorpholine and vinyl pyrrolidone, an adhesion improver that improves adhesion to the base material, such as acryloyl isocyanate, may be used as the monofunctional monomer.

The ratio of the monofunctional monomer is 0 to 20% by mass and more preferably 5 to 15% by mass. Adhesion between the base material and the cured resin is improved by using the monofunctional monomer. When the ratio of the monofunctional monomer is 20% by mass or less, the antifouling property or the abrasion resistance is sufficiently achieved, without a deficit of multifunctional (tetrafunctional or higher) (meth)acrylate or bifunctional or higher hydrophilic(meth) acrylate.

The monofunctional monomer may be mixed by 0 to 35 parts by mass to an active energy beam-curable resin composition, as a copolymer with a low polymerization degree (co)polymerized with one, or two or more kinds. The polymer with a low polymerization degree may be a copolymer oligomer (MG polymer made by MRC Unitech) of monofunctional (meth)acrylates having a polyethylene glycol chain in an ester group, such as M-230G (made by SHIN-NAKAMURA CHEMICAL CO., LTD) and methacrylamide propyltrimethyl ammonium methyl sulfate of 40/60.

In the antireflection article 10 described above, the plurality of convex portions 19 are disposed on the first surface 11 at the visible side and the second surface 13 opposite to the surface, the average gap between the convex portions 19 is 400 nm or less, and the ratio (H2/W2) between the height H2 of the convex portions and the width W2 of the bottoms of the convex portions in the second surface of the antireflection article 13 is larger than the ratio (H1/W1) between the height H1 of the convex portions and the width W1 of the bottoms of the convex portions, such that the first surface that a person or an object may touch has sufficient abrasion resistance, and thus, it is possible to suppress reflectance throughout the visible light range to a low level.

Further, the antireflection article of the present invention is not limited to the antireflection article 10 shown in the figures. For example, although the convex portions 19 are formed on the surface of the cured resin film 20 of the antireflection film 16 in the antireflection article 10, the convex portions 19 may be directly formed on the surface of the film main body 18 without disposing the cured resin film 20, or may be directly formed on the surface of the base main body 12 without bonding the antireflection film 16. However, it is preferable that a plurality of the convex portions 19 be formed on the surface of the cured resin film 20 of the antireflection film 16 from the viewpoints that a plurality of the convex portions 19 can be effectively formed by using the roll-shaped mold 22, and that the antireflection film 16 can be adhered again when the protrusions 19 are damaged.

<Use>

In terms of use, the antireflection article of the present invention may be disposed where one surface may be touched by a person or an object and the other surface is not likely to be touched by a person or an object, such as the protective plate or the protective filter, which is provided with an antireflection function, in a display device, the surface protection plate of a solar cell, the cover of meters and gauges, the front plate of a light, the front plate of a frame, the case of an art object, a showcase, glasses or the like.

For example, in the case of the display device, the antireflection article according to the present invention is disposed on the front side of the screen of the display device such that the first surface is disposed in the visible side and the second surface is disposed in the display device side.

EXAMPLES

Although the present invention is described in detail by examples, the present invention is not limited thereto.

(Shape of Convex Portion)

The average gap of the convex portions, the height of the convex portions, the width of the bottoms of the convex portions, and the curvature radius of the tips of the convex portions were measured by depositing platinum to a cross-section of the cured resin film for 5 minutes and observing the cross-section with a field-emission scanning electron microscope (JSM-7400F made by Jeol Ltd.) under an acceleration voltage of 3.00 kV. The measuring was performed at five points, respectively, and the average value was acquired.

(Reflectance Features)

Luminous reflectance was calculated according to JISR3106 by measuring the relative reflectance of the antireflection article in the range of wavelength of 380 to 780 nm and an incident angle of 5°, using a spectrophotometer (U-4000 made by Hitachi, Ltd.).

The difference between the maximum reflectance and the minimum reflectance in the range of wavelength of 380 to 780 nm was $\Delta R$.

(Abrasion Resistance)

An abrasion experiment of the surface of the cured resin film at the first surface was performed using a lens cleaner (TORAYSEE (registered trademark) by TORAY INDUSTRIES, INC.). The condition was a load of 2000 g/20 mm$\phi$ and 1000 revolutions. Evaluation was made with reference to Table 3.

(Comprehensive Evaluation)

Abrasion resistance is considered an important factor in an antireflection article disposed where the first surface may be touched by a person or an object and the second surface is not likely to be touched by a person or an object. That is, it is impossible to achieve excellent reflectance features only by light touch of a person of an object, when the abrasion resistance is not sufficient no matter how excellent the reflectance feature is. Therefore, in the example, comprehensive evaluation of the antireflection article was performed the evaluation shown in Tables 1 to 3 on luminous reflectance, ΔR, and abrasion resistance. In the comprehensive evaluation, the sum of the following points was calculated for each evaluation result, in which the sum of 8 or more was A, 7 was B, 6 was C, and 5 or less was D.

a=3 points
b=2 points
c=1 point
d=0 points

TABLE 1

| Luminous reflectance | |
| --- | --- |
| 0.35% or less | a |
| more than 0.35% and 0.4% or less | b |
| more than 0.4% and 1.0% or less | c |
| more than 1.0% | d |

TABLE 2

| ΔR | |
| --- | --- |
| 0.4% or less | a |
| more than 0.4% and 0.7% or less | b |
| more than 0.7% and 1.0% or less | c |
| more than 1.0% | d |

TABLE 3

| Abrasion resistance | |
| --- | --- |
| scars under 3 | a |
| 3 to 5 scars | b |
| 6 to 9 scars | c |
| 10 or more scars | d |

[Manufacturing of Mold a]

Process (a):

Anodizing was performed for 0.5 hours at a voltage of 40V and a temperature of 16° C., using a 99.99% aluminum plate having a thickness of 2 mm for the anode and the cathode, in which oxalic acid of 0.3M was used as an electrolyte.

Process (b):

The anode coated with an oxide film was immersed in mixed acid of phosphoric acid of 6% by mass/chromic acid of 1.8% by mass at 70° C., thereby removing the oxide film.

Process (c):

Anodizing was performed for 20 seconds at a voltage of 40V and a temperature of 16° C., using oxalic acid of 0.3M as an electrolyte, after cleaning the anode with pure water.

Process (d):

The fine pore diameter increasing process was performed by immersing the anode in phosphoric acid of 5% by mass at 32° C. for 8 minutes.

Process (e):

A mold a where anodized alumina, which has substantially conical fine pores having the average gap of 100 nm and a depth of the fine pores of 161 nm, was acquired by repeating the processes (c) and (d) five times.

Further, it was possible to adjust the depth of the pores by adjusting the time of the process (c) and/or the temperature of the process (d). For example, it was possible to acquire a mold in which the average gap of the fine pores was 100 nm and the depth of the fine pores was 190 nm by performing, for example, the process (c) for 30 seconds and the process (d) at 31.5° C. Further, it was possible to acquire a mold in which the depth of the fine pores was 240 nm by performing the process (c) for 35 seconds and the process (d) at 31.5° C. As described above, in the following example, various molds (molds (b) to (d)) in which the depths of the fine pores were different were acquired by variously changing the conditions of the process (c) and/or the process (d).

Fluorination was performed on the surface of the oxide film by treating the mold a with a diluted solution of 0.1% by mass of Optool DSX (DAIKIN INDUSTRIES, Ltd.).

[Manufacturing of Molds (b)~(d)]

Molds (b)~(d) in which the average gap of the fine pores was 100 nm and the depths of the fine pores were different were acquired under the same conditions as the manufacturing of the mold a, except for adjusting the time of the process (c) and the temperature of the process (d).

[Preparation of Active Energy Beam-curable Resin Composition A]

An active energy beam-curable resin composition A was acquired by mixing 45 parts by mass of a condensation reaction mixture with a mole ratio of 1:2:4 of succinic acid/trimethylolethane/acrylic acid, 45 parts by mass of 1,6-hexanediol diacrylate (by Osaka Organic Chemical Industry Ltd.), 10 parts by mass of radical polymerizable silicone oil (by Shin-Etsu Chemical Co., Ltd), 3 parts by mass of 1-hydroxy cyclohexyl phenyl ketone (Irugacure (registered trademark) 184 by Chibaspecialty Chemical Corporation), and 0.2 parts by mass of bis(2,4,6-trimethyl benzoyl)-phenyl phosphineoxide (Irugacure (registered trademark) 819 by Chibaspecialty Chemical Corporation).

[Manufacturing of Antireflection Film α]

An active energy beam-curable resin composition A was applied on the mold (a) and an acrylic film (ACRYLPLEN (registered trademark) HBS010, by Mitsubishi Rayon Co., Ltd.) was coated thereon.

The active energy beam-curable resin composition A was cured by radiating ultraviolet rays with integrated light intensity of 400 mJ/cm² over the acrylic film using UV radiation (high-pressure mercury lamp) and then an antireflection film α with convex portions on the surface was acquired by separating the active energy beam-curable resin composition A from the mold (a).

The average gap of the convex portions was 100 nm, the height of the convex portions was 140 nm, the width of the bottoms of the convex portions was 100 nm, and the curvature radius of the tips of the convex portions was 30 nm.

[Manufacturing of Antireflection Film β]

An antireflection film β was acquired under the same conditions as the manufacturing of antireflection film α, except for using the mold (b).

The average gap of the convex portions was 100 nm, the height of the convex portions was 180 nm, the width of the bottoms of the convex portions was 100 nm, and the curvature radius of the tips of the convex portions was 30 nm.

[Manufacturing of Antireflection Film γ]

An antireflection film γ was acquired under the same conditions as the manufacturing of antireflection film α, except for using the mold c.

The average gap of the convex portions was 100 nm, the height of the convex portions was 220 nm, the width of the bottoms of the convex portions was 100 nm, and the curvature radius of the tips of the convex portions was 30 nm.

[Manufacturing of Antireflection Film δ]

An antireflection film δ was acquired under the same conditions as the manufacturing of antireflection film α, except for using the mold d.

The average gap of the convex portions was 100 nm, the height of the convex portions was 120 nm, the width of the bottoms of the convex portions was 100 nm, and the curvature radius of the tips of the convex portions was 25 nm.

[Manufacturing of Antireflection Film ε]

An antireflection film ε was acquired under the same conditions as the manufacturing of antireflection film α, except for using the mold e.

The average gap of the convex portions was 100 nm, the height of the convex portions was 160 nm, the width of the bottoms of the convex portions was 100 nm, and the curvature radius of the tips of the convex portions was 30 nm.

[Manufacturing of Antireflection Film ζ]

An antireflection film ζ was acquired under the same conditions as the manufacturing of antireflection film α, except for using the mold f.

The average gap of the convex portions was 100 nm, the height of the convex portions was 200 nm, the width of the bottoms of the convex portions was 100 nm, and the curvature radius of the tips of the convex portions was 30 nm.

Example 1

An antireflection article was acquired by bonding an antireflection film a on the front surface (first surface) of an acryl plate having a thickness of 2 mm and an antireflection film β on the rear surface (second surface), using an optical double-side bonding tape (CS0622T by Nitto Denko Corporation). A reflectance feature and abrasion resistance of the antireflection article were evaluated. The evaluation result is shown in Table 4.

Example 2

An antireflection article was acquired by bonding an antireflection film α on the front surface (first surface) of an acryl plate having a thickness of 2 mm and an antireflection film γ on the rear surface (second surface), using an optical double-side bonding tape (CS0622T by Nitto Denko Corporation). A reflectance feature and an abrasion resistance of the antireflection article were evaluated. The evaluation result is shown in Table 4.

Example 3

An antireflection article was acquired by bonding an antireflection film ε on the front surface (first surface) of an acryl plate having a thickness of 2 mm and an antireflection film β on the rear surface (second surface), using an optical double-side bonding tape (CS0622T by Nitto Denko Corporation). A reflectance feature and an abrasion resistance of the antireflection article were evaluated. The evaluation result is shown in Table 4.

Example 4

An antireflection article was acquired by bonding an antireflection film ε on the front surface (first surface) of an acryl plate having a thickness of 2 mm and an antireflection film ζ on the rear surface (second surface), using an optical double-side bonding tape (CS0622T by Nitto Denko Corporation). A reflectance feature and an abrasion resistance of the antireflection article were evaluated. The evaluation result is shown in Table 4.

Example 5

An antireflection article was acquired by bonding an antireflection film β on the front surface (first surface) of an acryl plate having a thickness of 2 mm and an antireflection film ζ on the rear surface (second surface), using an optical double-side bonding tape (CS022T by Nitto Denko Corporation). A reflectance feature and an abrasion resistance of the antireflection article were evaluated. The evaluation result is shown in Table 4.

Example 6

An antireflection article was acquired by bonding an antireflection film β on the front surface (first surface) of an acryl plate having a thickness of 2 mm and an antireflection film γ on the rear surface (second surface), using an optical double-side bonding tape (CS0622T by Nitto Denko Corporation). A reflectance feature and an abrasion resistance of the antireflection article were evaluated. The evaluation result is shown in Table 4.

Example 7

An antireflection article was acquired by bonding an antireflection film ζ on the front surface (first surface) of an acryl plate having a thickness of 2 mm and an antireflection film γ on the rear surface (second surface), using an optical double-side bonding tape (CS0622T by Nitto Denko Corporation). A reflectance feature and an abrasion resistance of the antireflection article were evaluated. The evaluation result is shown in Table 4.

Comparative Example 1

An antireflection article was acquired by bonding an antireflection film α on both surfaces of an acryl plate having a thickness of 2 mm, using an optical double-side bonding tape (CS0622T by Nitto Denko Corporation). A reflectance feature and an abrasion resistance of the antireflection article were evaluated. The evaluation result is shown in Table 4.

Comparative Example 2

An antireflection article was acquired by bonding an antireflection film ε on both surfaces of an acryl plate having a thickness of 2 mm, using an optical double-side bonding tape (CS0622T by Nitto Denko Corporation). A reflectance feature and an abrasion resistance of the antireflection article were evaluated. The evaluation result is shown in Table 4.

Comparative Example 3

An antireflection article was acquired by bonding an antireflection film β on both surfaces of an acryl plate having a thickness of 2 mm, using an optical double-side bonding tape (CS0622T by Nitto Denko Corporation). A reflectance feature and an abrasion resistance of the antireflection article were evaluated. The evaluation result is shown in Table 4.

Comparative Example 4

An antireflection article was acquired by bonding an antireflection film γ on the front surface (first surface) of an acryl plate having a thickness of 2 mm and an antireflection film γ on the rear surface (second surface), using an optical double-side bonding tape (CS0622T by Nitto Denko Corporation). A reflectance feature and abrasion resistance of the antireflection article were evaluated. The evaluation result is shown in Table 4.

Comparative Example 5

An antireflection article was acquired by bonding an antireflection film δ on the front surface (first surface) of an acryl plate having a thickness of 2 mm and an antireflection film γ on the rear surface (second surface), using an optical double-side bonding tape (CS0622T by Nitto Denko Corporation). A reflectance feature and abrasion resistance of the antireflection article were evaluated. The evaluation result is shown in Table 4.

Comparative Example 6

An antireflection article was acquired by bonding an antireflection film β on the front surface (first surface) of an acryl plate having a thickness of 2 mm and not bonding anything on the rear surface (second surface), using an optical double-side bonding tape (CS0622T by Nitto Denko Corporation). A reflectance feature and abrasion resistance of the antireflection article were evaluated. The evaluation result is shown in Table 4.

TABLE 4

| | Front surface shape H1/W1 | Rear surface shape H2/W2 | (H1/W1) + (H2/W2) | Reflection feature | | | | Abrasion resistance | Comprehensive evaluation |
|---|---|---|---|---|---|---|---|---|---|
| | | | | Luminous reflectance (%) | | ΔR | | | |
| Example 1 | 1.4 | 1.8 | 3.2 | 0.29 | a | 0.96 | c | a | B |
| Example 2 | 1.4 | 2.2 | 3.6 | 0.34 | a | 0.53 | b | a | A |
| Example 3 | 1.6 | 1.8 | 3.4 | 0.21 | a | 0.93 | c | a | B |
| Example 4 | 1.6 | 2 | 3.6 | 0.27 | a | 0.65 | b | a | A |
| Example 5 | 1.8 | 2 | 3.8 | 0.27 | a | 0.5 | b | b | B |
| Example 6 | 1.8 | 2.2 | 4.0 | 0.27 | a | 0.39 | a | b | A |
| Example 7 | 2 | 2.2 | 4.2 | 0.32 | a | 0.34 | a | b | A |
| Comparative example 1 | 1.4 | 1.4 | 2.8 | 0.37 | b | 1.2 | d | a | D |
| Comparative example 2 | 1.6 | 1.6 | 3.2 | 0.21 | a | 1.1 | d | a | C |
| Comparative example 3 | 1.8 | 1.8 | 3.6 | 0.21 | a | 0.76 | c | b | C |
| Comparative example 4 | 2.2 | 2.2 | 4.4 | 0.32 | a | 0.32 | a | d | C |
| Comparative example 5 | 1.2 | 2.2 | 3.4 | 0.56 | c | 1.5 | d | a | D |
| Comparative example 6 | 1.8 | — | — | 4.36 | d | 0.36 | a | b | D |

Industrial Applicability

An antireflection article of the present invention is useful for a protective filter, which is provided with an antireflection function, in a display device, the surface protection plate of a solar cell, the cover of meters and gauges, the front plate of a light, the front plate of a frame, the case of an art object, a showcase, and glasses.

Brief Description of the Reference Symbols

10: antireflection article
11: first surface
13: second surface
19: convex portion

What is claimed is:

1. An antireflection article that has light transmittance, comprising
    a plurality of convex portions disposed on a first surface positioned at a visible side and a second surface opposite to the first surface, wherein
    an average gap of the convex portions is 400 nm or less,
    a ratio (H1/W1) of a height H1 of the convex portions and a width W1 of bottoms of the convex portions is 1.3 to 1.7, in the first surface, and
    a ratio (H2/W2) of a height H2 of the convex portions and a width W2 of bottoms of the convex portions is larger by 0.3 or more than the ratio (H1/W1), in the second surface
    a difference (ΔR) between a maximum reflectance and a minimum reflectance of reflected light from the antireflection article in a range of wavelength of 380 to 780 nm is 1.0% or less.

2. The antireflection article according to claim 1, wherein the difference (ΔR) between a maximum reflectance and a minimum reflectance in a range of wavelength of 380 to 780 nm is 0.6% or less.

3. The antireflection article according to claim 1, wherein H1/W1+H2/W2≥3.1.

4. The antireflection article according to claim 1, wherein luminous reflectance of the antireflection article is 0.4% or less.

5. The antireflection article according to claim 1 comprising a base main body and antireflection films which are bonded to a front surface and a rear surface of the base main body,
    wherein the plurality of convex portions is disposed on surfaces of the antireflection films, and
    the base main body is at least one base material having light transmittance selected from the group consisting of a glass, an acrylic resin, a polycarbonate, a styrene-based resin, a polyester, a cellulosic resin, a polyolefin, and an alicyclic polyolefin.

6. A display device comprising:
    a display main body; and
    the antireflection article according to claim 1 which is disposed ahead of a screen of the display main body, with the first surface at a visible side and the second surface at the display main body side.

7. A display device comprising:

a display main body; and the antireflection article according to claim 3 which is disposed ahead of a screen of the display main body, with the first surface at a visible side and the second surface at the display main body side.

* * * * *